United States Patent [19]

Wood et al.

[11] 4,384,607

[45] May 24, 1983

[54] METHOD OF MANUFACTURING A BLADE OR VANE FOR A GAS TURBINE ENGINE

[75] Inventors: Andrew G. B. Wood, Duffield; Anthony G. Gale, Wollaton, both of England

[73] Assignee: Rolls-Royce Limited, London, England

[21] Appl. No.: 926,961

[22] Filed: Jul. 13, 1978

[30] Foreign Application Priority Data

Jul. 22, 1977 [GB] United Kingdom ............... 30810/77

[51] Int. Cl.[3] ......................... B29D 29/00; B29C 1/02

[52] U.S. Cl. ....................................... 164/132; 164/34; 164/35; 164/36

[58] Field of Search ....... 264/221, 225, 227, DIG. 44; 164/14, 34, 35, 36, 132

[56] References Cited

U.S. PATENT DOCUMENTS 3,961,010 6/1976 Holmes .............................. 264/221

3,985,176 10/1976 Wamester ....................... 264/225 X

*Primary Examiner*—Richard D. Lovering

*Attorney, Agent, or Firm*—Cushman, Darby & Cushman

[57] ABSTRACT

A method of casting a blade or vane for a gas turbine engine which enables the production of more complex internal shapes than those which may be made by prior art methods. The method of the invention includes the steps of:

making a temporary filler piece from a disposable material, holding the filler piece in place in a die, injecting the core material into the die and causing it to solidify round the filler piece, removing the core from the die, causing the filler to be removed from the core to leave within the core a cavity having the shape of the filler, and using the core thus produced in an investment casting process to form the blade or vane shape.

6 Claims, 4 Drawing Figures

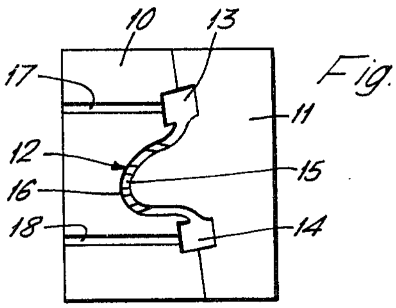
Fig. 1.
Fig. 2.
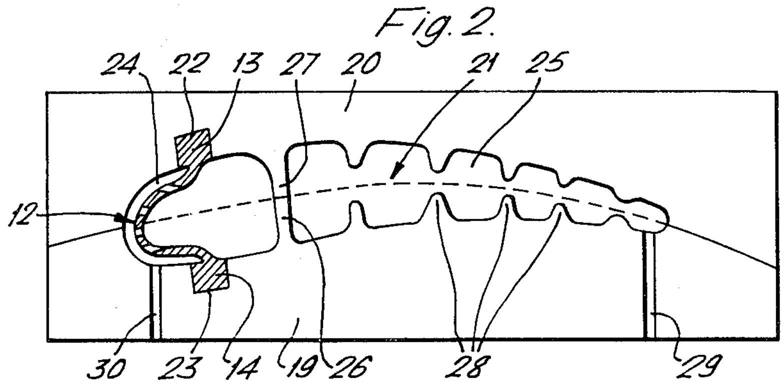
Fig. 3.
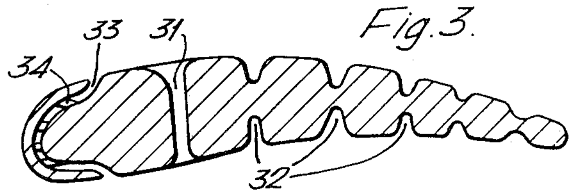
Fig. 4.
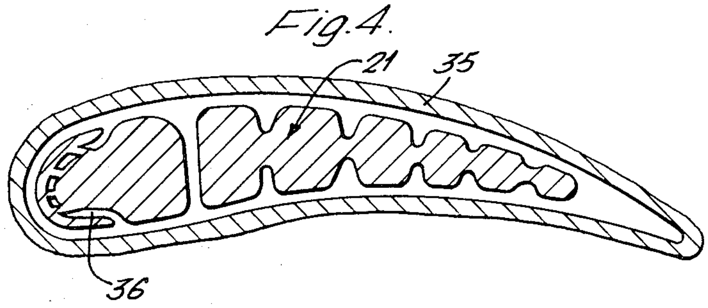

METHOD OF MANUFACTURING A BLADE OR VANE FOR A GAS TURBINE ENGINE

BACKGROUND OF THE INVENTION

This invention relates to a method of manufacturing a blade or vane for a gas turbine engine and to a core suitable for use in this method.

In the investment casting process it is common to use a core, usually made of a ceramic material, which is held in the mould while the casting is made and whose exterior surface defines the interior surface of a cavity within the finished casting. Such cores are normally subsequently leached out or otherwise removed from the casting to leave the desired cavity. In certain castings, e.g. those which form the cooled blades or vanes in a gas turbine engine, the shape of the internal cavity becomes highly complex and must be very accurate. In these cases, the core itself is normally made as an injection moulding using a split die in two or more pieces which assemble together.

However because the split die technique requires that all projections on the die, and hence cavities in the core, extend or are tapering in the direction of die withdrawal, considerable constraint has been placed on the shape of core which can be made. This has lead to the necessity to form the interior cavity of cooled gas turbine blades or vanes by a combination of casting, machining and fabrication techniques which has increased the cost of the finished product to a considerable degree.

The present invention provides a method of making a blade or vane for a gas turbine engine using a core whose shape is less subject to the limitations imposed by the prior art coremaking process.

BRIEF DESCRIPTION OF THE INVENTION

According to the present invention a method of manufacturing a blade or vane for a gas turbine engine comprises making a temporary filler piece from a disposable material, holding the filler in place in a die, injecting the core material into the die and causing it to solidify round the filler piece, removing the core from the die and causing the filler to be removed from the core to leave within the core a cavity having the shape of the filler, and using the core thus produced in an investment casting process to form the blade or vane shape.

The disposable material may comprise a material which may be leached out of the core by chemical attack, or it may be of a low melting point so that it can be melted out of the core, or it may be of easily combustible material which can be burnt out, and the step of removing the filler from the core may thus comprise a leaching or a heating process as is appropriate.

Preferably the temporary piece is provided with projections which are located in corresponding indentations in the core die to locate the piece during injection and solidification of the core.

The invention also includes in its scope a core suitable for an investment casting process in accordance with any of the above statements of invention, and a blade made by the method.

BRIEF DESCRIPTION OF THE DRAWINGS

The invention will now be particularly described, merely by way of example, with reference to the accompanying drawings in which:

FIG. 1 is a section through an injection moulding die producing a temporary filler piece in one step of the method of the invention, FIG. 2 is a section through a further injection moulding die used in a further step of the method of the invention, FIG. 3 is a section through a core in accordance with the invention produced using the apparatus of FIGS. 1 and 2, and FIG. 4 is a section through a casting mould in which the core of FIG. 3 is used.

DESCRIPTION OF THE PREFERRED EMBODIMENTS

In FIG. 1 there is shown a die formed from two cooperating sections 10 and 11, these sections being cut away so that between them they define the shape of a temporary filler piece generally indicated at 12. The piece 12 broadly consists of two longitudinally extending rails 13 and 14 between which extends a curved, thin section 15 through which extend projections 16 which eventually form holes through the thin section 15.

It will be understood that FIG. 1, in common with all the Figures of the drawings, shows merely a transverse cross-section of the die in question and that in fact the piece 12 is longitudinally extending. This is not of crucial importance to the invention and the drawings do not therefore indicate the longitudinal extent. Of course, the shape of the die will vary with the shape of the final object required to be cast.

Sprue passages 17 and 18 may be provided in the die section 10 so that a disposable material may be injected into the space between the sections to fill this space and produce the filler piece 12. A number of possibilities exist for the material used for the filler piece 12. Thus a material such as hard wax could be used, or a low melting point metal, or a material which may be dissolved or otherwise attacked by a chemical, or an inflammable material which may be burnt.

To form the filler piece, the die sections 10 and 11 are assembled together and held in place by means not shown. The chosen material is injected through the feed passage 17 in fluid, plastic or slurry form, until the cavity between the sections is full. The fluid, plastic or slurry filling the die is then caused to solidify. The process used to do this will vary in accordance with the type of material used; thus if the material is molten it may simply be allowed to cool and solidify, if it is a thermosetting resin it may be necessary to apply heat to the die to cause curing of the resin, and if a chemical process is used it may merely be necessary to allow sufficient time for the chemical reaction to occur.

The die sections 10 and 11 are then separated to leave the temporary piece 12; it may be necessary to carry out a fettling or similar step to remove the traces of the sprue ducts from the piece.

Referring now to FIG. 2 there is shown the piece 12 assembled between the sections 19 and 20 of a core die. In a similar way to the die of FIG. 1, the two sections are cut-away to provide between them a cavity having the form of the core 21 required. However, in this case channels 22 and 23 are provided in the faces of the die, these channels corresponding in size and shape with the rails 13 and 14 of the temporary filler piece 12. The temporary filler piece 12 is then assembled between the core die sections 19 and 20 of the core die and located by the engagement of the rails 13 and 14 in the channels 22 and 23. Other means of support for the piece 12 could obviously be used.

The piece 12 thus forms in the left hand portion of the cavity an apertured partition between an extreme left hand cavity 24 and the main cavity 25. Other features of note are that projections 26 and 27 from the die sections 19 and 20 meet at their tips to produce bars extending across the cavity; it will be appreciated that although in the sectional view of the drawings the projections 26 and 27 appear to divide the cavity 25 into two, in fact the bar formed by this pair of projections is one of a longitudinally extending series having spaces therebetween.

The remainder of the main cavity 25 is provided with smaller longitudinally extending projections 28 which merely provide an extended surface to this cavity, and feed and exit passages 29 and 30 extend through the die section 19 into the cavities 25 and 24 respectively.

In use, the die sections 19 and 20 are assembled together in the positions shown in FIG. 2 with the filler piece 12 in position. The sections are held together by means not shown, and the core material is injected in fluid, plastic or slurry form through the feed passage 29 and into the cavity 25 to fill it.

The die of FIG. 2, with its cavity filled with the fluid, plastic or slurry material, is then subjected to the treatment necessary to cause the material to solidify. As described above in connection with the FIG. 1 die, this treatment will depend upon the type of material used to form the core, but a conventional material for these cores takes the form of a ceramic, which is injected as a liquid or semi-liquid slurry and is then heated or cooled or chemically set to cause the mass to solidify and harden.

When the material of the core has been hardened, the die of FIG. 2 is split and the two sections 19 and 20 are separated to leave the core 21 with the filler piece 12 embedded within it. It is at this stage that the limitations of the prior art process become apparent, since it will be clear that projections from the die portions, in this case halves, must extend only in the direction of separation of the halves, and that there must be no re-entrant portions of the die faces, otherwise separation of the die halves will damage or destroy the solid core. Thus in the illustrated embodiment the projections 27 and 26 extend in the correct direction to be withdrawable from the core; if the angle of these projections was significantly altered a re-entrant face might be formed which would make separation impossible. It will be understood that this causes a serious limitation on the shape of core which may be made by the prior art process, even when more than two die portions are used. In this case the dies become extremely expensive, wear out quickly and permit only slow production rates.

When the core is released from its die, it may again be necessary to perform a fettling operation to remove the witness of the sprues, and then it is necessary to remove the piece 12. The process used for this removal will again depend on the nature of the material itself; thus if the material is intended to be melted or burnt out of the core, a heating step will be necessary. On the other hand, if the material is intended to be leached out or otherwise removed by chemical action it may be necessary to immerse the core in the appropriate chemical solvent or reagent.

In this way the filler piece 12 is removed from the core, to leave a corresponding cavity. It will be understood that it will only be possible to remove those portions of the piece 12 having access to the outer surface of the core; if any part of the piece is totally enclosed by the core material, it will not be possible to remove it without damaging the remainder of the core. Thus if a totally enclosed portion is required it may be necessary to provide an interconnection to allow access to the interior, the connection or its cast equivalent being closed off at a later stage.

FIG. 3 shows in section the finished core. It will be seen that it has simple holes 31 and indentations 32 produced by the projections 26, 27 and 28 in the moulding process, and the more complex cavity 33 left upon removal of the filler piece. This cavity clearly could not be made by the prior art process because it forms many re-entrant surfaces and because the thin projections 34 which correspond with holes 16 in the portion 15 of the filler piece would prevent withdrawal of the die from the core.

Finally, FIG. 4 indicates how the core of FIG. 3 is used in a lost-wax investment casting process to manufacture a blade or vane for a gas turbine engine. The core 21 is held in place by means not shown within a shell mould 35 produced by conventional lost wax techniques. Molten metal is poured into the shell mould and fills the spaces between the mould and the core, and the cavities within the core. When it has cooled and solidified the mould and core are removed from the metal blade or vane section thus formed. Normally this removal is effected chemically using a reagent which selectively attacks the core and mould material.

The thin apertured portion 36 shows how the process of the invention may be used to provide a feature within a blade or vane which may be useful for the provision of impingement cooling to the leading edge of the aerofoil. It will be understood by those skilled in the art that such features have previously been made as a separate sheet metal construction which must subsequently be mounted in the aerofoil in separate manufacturing operations. The present invention makes it possible to cast at least simple features of this nature directly into the blade.

It should be noted that a variety of alternatives to the process described above are available. Thus the filler piece may be made by numerous techniques other than injection moulding; it could be fabricated or even hand carved or shaped. It will also be seen that in some circumstances other ways of removing the filler could be used; thus a simple cylindrical filler could be simply withdrawn.

We claim:

1. A method of manufacturing a blade or vane for use in a flow of hot gases of a gas turbine engine comprising the sequential steps of:

(a) making a temporary filler piece of a complex shape from a disposable material by injection molding the disposable material into a sectional die having a cavity defining the complex shape and causing the disposable filler to solidify;

(b) removing the filler piece from the sectional die and then positioning and holding the filler piece in place in a sectional core die having a cavity defining the external shape of a core;

(c) injecting a ceramic core material into the core die and causing it to solidify in the cavity thereof around the filler piece to form a ceramic core;

(d) removing the ceramic core with the filler piece therein from the core die; thereafter (e) removing the filler piece from the ceramic core by destroying the same to leave the ceramic core with a cavity having the complex shape of the filler piece;

(f) coating the ceramic core with a wax to define an external shape of the blade or vane to be manufactured;

(g) forming a shell of ceramic material on the exterior surface of the wax;

(h) removing the wax from between the ceramic core and the ceramic shell to form a mold;

(i) casting molten metal into the mold formed by the ceramic shell and the ceramic core to make the blade or vane with an interior configuration of the complex shape of ceramic core and an exterior configuration of the interior of the ceramic shell; and thereafter (j) removing the thus cast blade or vane from the mold formed by the ceramic shell and the ceramic core by destroying the ceramic core from the interior of the blade or vane and ceramic shell from the outside of the blade or vane.

2. A method as claimed in claim 1 and in which the temporary filler piece is made of a leachable material and is destroyed by leaching out of the core by chemical attack.

3. A method as claimed in claim 1 and in which the temporary filler piece is removed from the core by heating the core to a high temperature.

4. A method as claimed in claim 3 and in which the temporary filler piece is made of a material having a low melting point and is destroyed by melting the same out of the core.

5. A method as claimed in claim 3 and in which the temporary filler piece is made of a combustible material and is destroyed by burning out of the core.

6. A method as claimed in claim 1 and in which the temporary filler piece is provided with projections which locate in corresponding indentations in the core die to locate the piece during injection and solidification of the core material.

* * * * *